Patented July 8, 1941

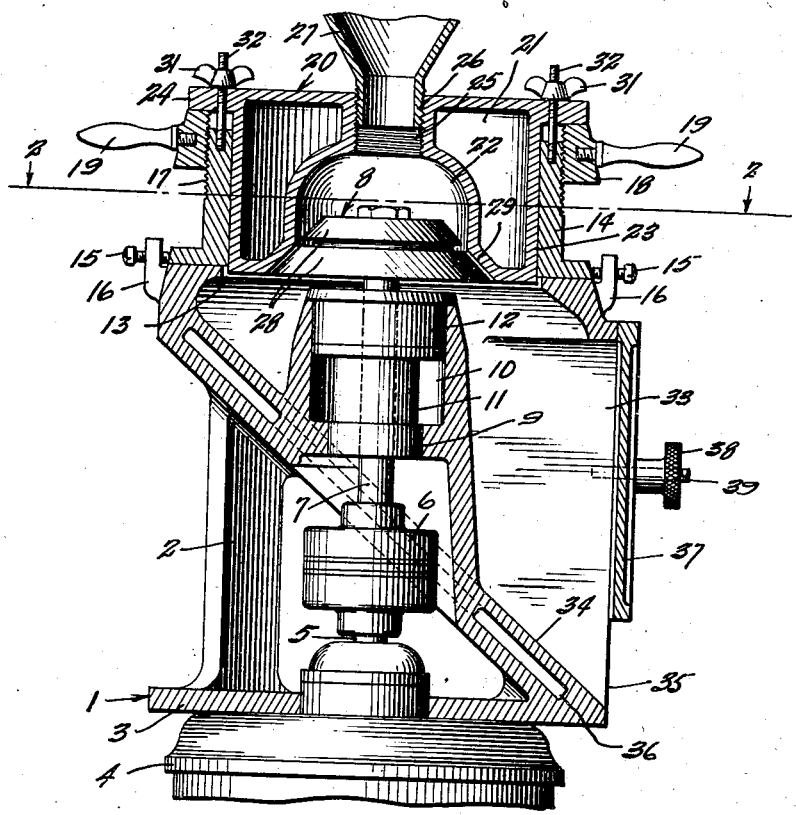

2,248,886

UNITED STATES PATENT OFFICE 2,248,886

MIXING DEVICE FOR PREPARING MIXTURES SUCH AS MAYONNAISE AND SALAD DRESSING

William A. McLean, Geneva, N. Y., assignor to Geneva Processes, Inc., Geneva, N. Y., a corporation of New York Original application March 31, 1936, Serial No. 71,932. Divided and this application January 5, 1938, Serial No. 183,549. Renewed June 14, 1940

4 Claims. (Cl. 259—9)

My invention relates to mixing and emulsifying devices for materials such as emulsions containing high percentages of oil, such as mayonnaise, salad dressings, insecticide emulsions, etc. The mixtures may or may not be truly colloidal.

This application is a division of my co-pending case Serial No. 71,932 filed March 31, 1936, now Patent No. 2,125,455 dated Aug. 2, 1938.

An object of my invention is to provide a device of the character described which will quickly and simply make a homogeneous mixture, or a colloid, if desired.

A further object of the invention is to provide a construction which is simple and durable and which is easily repaired and with parts easy to replace.

A still further object of my invention is to provide a mixing mill which has a large output with small consumption of power and which gives a desired homogeneity to the final product.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions, which, for the purpose of explanation, have been made the subject of illustration.

In the drawing,

Figure 1 is a view in longitudinal section of one form of my mill;

Figure 2 is a view taken along the line 2—2 of Figure 1, looking in the direction of the arrows.

Referring to the drawing I have shown a support structure 1 provided with support spiders 2, the base of the support structure 1 being designated by the numeral 3. The base 3 is adapted to lie on the casing 4 of an electric motor. The shaft of the motor projects upwardly, as indicated at 5, and is coupled by means of a coupling 6 to a shaft 7 of a rotor member 8. The shaft 7 is journaled in the supporting structure 1 at a point 9. Above the point 9, and forming the casing, is a cylindrical aperture 10 in which are housed journal members 11 and 12. The rotor 8 is a frusto-conical element with a smooth surface. Mounted over a cylindrical operature 13 formed in the upper part of the support structure 1 is a cylindrical support element 14 which is held by means of nuts 15 screwed through brackets 16 in the support structure 1 into a position such that its interior surface is substantially in line with the periphery of the aperture 13.

The support member 14 is provided with screw threads 17. At its top, screwed over the screw threads, is a screw threaded annulus 18 adapted to be manipulated by operating handles 19. Adapted to fit within the aperture formed in the support element 14 is a mixing chamber 20 comprising a water or steam jacket 21 which may be suitably connected to a supply of cooling or heating fluid (connections not shown), a bowl-shaped central chamber 22 and an exterior wall 23.

Formed at the top of this member 20 is a flange 24 which is adapted to rest on top of the annulus 18. In the top of the member 20 is an aperture 25 which is interiorly threaded and which is adapted to receive screw threaded extension 26 of a filling funnel or hopper 27. In this construction the rotor member 8 consists of two frusto-conical rotor members 28 with two frusto-conical sections having end surfaces lying in a continuation of each other. The device is provided with a frusto-conical working surface 29 which is approximately of the same dimensions as the end surface of the lower frusto-conical section 28.

The clearance between the rotor 8 and the bottom of the mixing chamber, i. e., the bottom of the interior portion 22 of the mixing chamber, is controlled by raising and lowering the entire mixing chamber construction 20 by means of rotating the handles 19 to screw the annular member 18 up or down, as desired. When the proper adjustment has been made, wing nuts 31 on the bolts 32 may be tightened to hold the adjustment fixed.

Below the bottom of the rotor is a receiving chamber 33 which is provided with a slanted chute-like element 34 against which the mixture falls. The mixture, such as mayonnaise, flows down the chute element 34 and out at the aperture 35. The chute element 34 may be provided with apertures 36 through which may be flowed steam or cooling liquid, as desired.

In order to prevent splashing of the material, aperture 35 is closed with a cover plate 37 which is held in place by knurled nuts 38 which are screwed on bolts 39 inserted in the metal of the support element 1, such as by screwing them into apertures formed in the support element 1.

In operation the required adjustment between the bottom of the mixing chamber 22 and the surface of the rotor 8 having been effected, the mixture is poured into the mixing chamber 22 until the surface of the rotor is completely covered, and in fact, under certain conditions, it is well to have the entire mixing chamber 22 filled with the rough mixture before mixing is started.

The mixture is further homogenized in passing out through the aperture between the bottom of the mixing chamber 22 and the rotor 8. The mixing chamber 22 can be cooled or heated by the fluid in its jacket as desired. The finished mixture, which may be mayonnaise or some similar material, falls into the space 33 below the rotor 8 where it may be either heated or cooled through fluid in the aperture 36 below the slide 34. The material flows out through the aperture 35 into a receptacle.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a mixing and emulsifying mill, a bowl-shaped mixing chamber provided with an outwardly and downwardly extending annular working portion, a double frusto-conical rotor, comprising upper and lower sections, the upper section having a smaller diameter than the lower section and being disposed in the said mixing chamber above the outwardly and downwardly extending annular portion thereof, the lower section being disposed in the mixing chamber in spaced relation to and substantially in the same horizontal plane with the said outwardly and downwardly extending working portion, and the said lower section and outwardly and downwardly extending working portion of the mixing chamber defining an outlet from the mixing chamber.

2. In a mixing and emulsifying mill, a bowl-shaped mixing chamber having an annular laterally off-set working surface at the lower end portion thereof, a double frusto-conical rotor comprising upper and lower sections being disposed in said mixing chamber, the upper section being of smaller diameter than the lower section, and the said lower section and laterally off-set working surface defining an outlet from the mixing chamber.

3. In a mixing and emulsifying mill, a bowl-shaped mixing chamber having a frusto-conical working stator surface at the lower end portion thereof, a double frusto-conical rotor disposed in the mixing chamber, said rotor being composed of upper and lower sections, having unequal diameters and the said lower section and frusto-conical working stator surface defining an outlet from the mixing chamber.

4. In a mixing and emulsifying mill, a bowl-shaped mixing chamber having a frusto-conical working stator surface at the lower end portion thereof, a double frusto-conical rotor composed of an upper and lower section disposed in the mixing chamber, the said lower section being substantially in the same horizontal plane as the said frusto-conical working stator surface, and the said lower section and working stator surface defining an outlet from the mixing chamber.

WILLIAM A. McLEAN.